US00RE47024E

(19) United States
(12) Reissued Patent
Parsche

(10) Patent Number: US RE47,024 E
(45) Date of Reissued Patent: Sep. 4, 2018

(54) APPARATUS FOR HEATING HYDROCARBONS WITH RF ANTENNA ASSEMBLY HAVING SEGMENTED DIPOLE ELEMENTS AND RELATED METHODS

(71) Applicant: HARRIS CORPORATION, Melbourne, FL (US)

(72) Inventor: Francis Eugene Parsche, Palm Bay, FL (US)

(73) Assignee: HARRIS CORPORATION, Melbourne, FL (US)

(21) Appl. No.: 15/478,351

(22) Filed: Apr. 4, 2017

Related U.S. Patent Documents

Reissue of:
(64) Patent No.: 9,194,221
Issued: Nov. 24, 2015
Appl. No.: 13/765,753
Filed: Feb. 13, 2013

(51) Int. Cl.
*E21B 36/04* (2006.01)
*E21B 43/24* (2006.01)
*H01Q 9/16* (2006.01)

(52) U.S. Cl.
CPC ..... *E21B 43/2401* (2013.01); *E21B 36/04* (2013.01); *H01Q 9/16* (2013.01); *Y10T 29/49016* (2015.01)

(58) Field of Classification Search
CPC ..... E21B 36/04; E21B 36/00; E21B 43/2401
See application file for complete search history.

(56) References Cited

U.S. PATENT DOCUMENTS 3,716,652 A 2/1973 Lusk et al.
4,140,179 A 2/1979 Kasevich et al.
4,180,819 A * 12/1979 Nakano ..... 343/792
4,207,574 A 6/1980 Toia
4,359,743 A 11/1982 DeSantis
4,508,168 A 4/1985 Heeren
4,524,826 A 6/1985 Savage
4,583,589 A * 4/1986 Kasevich ..... 166/60
4,647,941 A 3/1987 Myer
5,065,819 A 11/1991 Kasevich
5,109,927 A 5/1992 Supernaw et al.
5,455,548 A 10/1995 Grandchamp et al.
(Continued)

FOREIGN PATENT DOCUMENTS

GB 2341442 A 3/2000
JP 11325376 A 11/1999

*Primary Examiner* — Catherine S Williams
(74) *Attorney, Agent, or Firm* — Allen, Dyer, Doppelt + Gilchrist, P.A.

(57) ABSTRACT

The apparatus includes an RF antenna assembly to be positioned within a wellbore and coupled to an RF source. The RF antenna assembly includes a first tubular dipole element having opposing proximal and distal ends, an RF transmission line extending through the proximal end of the first tubular dipole element and including an inner conductor, an outer conductor, and a dielectric therebetween. The inner conductor extends outwardly beyond the distal end of the first tubular dipole element. The outer conductor is coupled to the distal end of the first tubular dipole element. The RF antenna assembly includes a second tubular dipole element having opposing proximal and distal ends, with the proximal end being adjacent the distal end of the first tubular dipole element and being coupled to the inner conductor, and a tubular balun.

10 Claims, 8 Drawing Sheets

(56) References Cited

U.S. PATENT DOCUMENTS

| | | | | |
|---|---|---|---|---|
| 5,568,161 | A | 10/1996 | Fulmer, Sr. | |
| 5,723,844 | A | 3/1998 | Dow et al. | |
| 6,154,179 | A | 11/2000 | Kohno | |
| 6,189,611 | B1 | 2/2001 | Kasevich | |
| 6,415,869 | B1 | 7/2002 | Smith | |
| 6,681,861 | B2 | 1/2004 | Davidson et al. | |
| 6,720,934 | B1 | 4/2004 | Price et al. | |
| 6,771,227 | B2 | 8/2004 | Tsai et al. | |
| 7,215,655 | B2 | 7/2007 | Javor et al. | |
| 7,245,655 | B1 * | 7/2007 | Javor et al. | 375/216 |
| 7,441,597 | B2 | 10/2008 | Kasevich | |
| 7,540,324 | B2 | 6/2009 | de Rouffignac et al. | |
| 7,562,707 | B2 | 7/2009 | Miller | |
| 7,631,690 | B2 | 12/2009 | Vinegar et al. | |
| 7,635,024 | B2 | 12/2009 | Karanikas et al. | |
| 7,644,765 | B2 | 1/2010 | Stegemeier et al. | |
| 7,673,681 | B2 | 3/2010 | Vinegar et al. | |
| 7,677,310 | B2 | 3/2010 | Vinegar et al. | |
| 7,677,314 | B2 | 3/2010 | Hsu | |
| 7,681,647 | B2 | 3/2010 | Mudunuri et al. | |
| 7,703,513 | B2 | 4/2010 | Vinegar et al. | |
| 7,717,171 | B2 | 5/2010 | Stegemeier et al. | |
| 7,730,945 | B2 | 6/2010 | Pieterson et al. | |
| 7,730,946 | B2 | 6/2010 | Vinegar et al. | |
| 7,730,947 | B2 | 6/2010 | Stegemeier et al. | |
| 7,798,220 | B2 | 9/2010 | Vinegar et al. | |
| 7,832,484 | B2 | 11/2010 | Nguyen et al. | |
| 7,841,401 | B2 | 11/2010 | Kuhlman et al. | |
| 7,841,408 | B2 | 11/2010 | Vinegar | |
| 7,841,425 | B2 | 11/2010 | Mansure et al. | |
| 7,845,411 | B2 | 12/2010 | Vinegar et al. | |
| 7,849,922 | B2 | 12/2010 | Vinegar et al. | |
| 7,866,386 | B2 | 1/2011 | Beer et al. | |
| 7,866,388 | B2 | 1/2011 | Bravo | |
| 7,891,421 | B2 | 2/2011 | Kasevich | |
| 7,931,086 | B2 | 4/2011 | Nguyen et al. | |
| 7,950,453 | B2 | 5/2011 | Farmayan et al. | |
| 7,962,288 | B2 | 6/2011 | Gleitman | |
| 8,003,014 | B2 | 8/2011 | Breay et al. | |
| 8,011,451 | B2 | 9/2011 | MacDonald | |
| 8,027,571 | B2 | 9/2011 | Vinegar et al. | |
| 8,042,610 | B2 | 10/2011 | Harris et al. | |
| 8,070,840 | B2 | 12/2011 | Diaz et al. | |
| 8,083,813 | B2 | 12/2011 | Nair et al. | |
| 8,128,786 | B2 | 3/2012 | White et al. | |
| 8,443,887 | B2 | 5/2013 | Parsche | |
| 8,494,775 | B2 | 7/2013 | Parsche | |
| 2002/0189817 | A1 | 12/2002 | Davidson et al. | |
| 2003/0032339 | A1 | 2/2003 | Bell et al. | |
| 2005/0200498 | A1 | 9/2005 | Gleitman | |
| 2009/0050318 | A1 * | 2/2009 | Kasevich | 166/248 |
| 2009/0242196 | A1 * | 10/2009 | Pao | E21B 43/2401 166/248 |
| 2010/0078163 | A1 | 4/2010 | Banerjee et al. | |
| 2010/0219182 | A1 | 9/2010 | Parsche | |
| 2010/0223011 | A1 | 9/2010 | Parsche | |
| 2010/0294488 | A1 | 11/2010 | Wheeler et al. | |
| 2010/0294489 | A1 | 11/2010 | Dreher, Jr. et al. | |
| 2012/0012219 | A1 | 1/2012 | Breay et al. | |
| 2012/0125608 | A1 | 5/2012 | Parsche | |
| 2012/0176138 | A1 | 7/2012 | Prammer | |
| 2013/0048277 | A1 | 2/2013 | Parsche et al. | |
| 2014/0110395 | A1 | 4/2014 | Parsche | |
| 2014/0262222 | A1 | 9/2014 | Wright et al. | |
| 2014/0262223 | A1 | 9/2014 | Wright et al. | |
| 2014/0262224 | A1 | 9/2014 | Ayers et al. | |

* cited by examiner

APPARATUS FOR HEATING HYDROCARBONS WITH RF ANTENNA ASSEMBLY HAVING SEGMENTED DIPOLE ELEMENTS AND RELATED METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to the field of hydrocarbon resource recovery, and, more particularly, to hydrocarbon resource recovery using radio frequency (RF) heating.

BACKGROUND OF THE INVENTION

Energy consumption worldwide is generally increasing, and conventional hydrocarbon resources are being consumed. In an attempt to meet demand, the exploitation of unconventional resources may be desired. For example, highly viscous hydrocarbon resources, such as heavy oils, may be trapped in tar sands where their viscous nature does not permit conventional oil well production. Estimates are that trillions of barrels of oil reserves may be found in such tar sand formations.

In some instances these tar sand deposits are currently extracted via open-pit mining. Another approach for in situ extraction for deeper deposits is known as Steam-Assisted Gravity Drainage (SAGD). The heavy oil is immobile at reservoir temperatures and therefore the oil is typically heated to reduce its viscosity and mobilize the oil flow. In SAGD, pairs of injector and producer wells are formed to be laterally extending in the ground. Each pair of injector/producer wells includes a lower producer well and an upper injector well. The injector/production wells are typically located in the pay zone of the subterranean formation between an underburden layer and an overburden layer.

The upper injector well is used to typically inject steam, and the lower producer well collects the heated crude oil or bitumen that flows out of the formation, along with any water from the condensation of injected steam. The injected steam forms a steam chamber that expands vertically and horizontally in the formation. The heat from the steam reduces the viscosity of the heavy crude oil or bitumen which allows it to flow down into the lower producer well where it is collected and recovered. The steam and gases rise due to their lower density so that steam is not produced at the lower producer well and steam trap control is used to the same affect. Gases, such as methane, carbon dioxide, and hydrogen sulfide, for example, may tend to rise in the steam chamber and fill the void space left by the oil defining an insulating layer above the steam. Oil and water flow is by gravity driven drainage urged into the lower producer well.

Operating the injection and production wells at approximately reservoir pressure may address the instability problems that adversely affect high-pressure steam processes. SAGD may produce a smooth, even production that can be as high as 70% to 80% of the original oil in place (OOIP) in suitable reservoirs. The SAGD process may be relatively sensitive to shale streaks and other vertical barriers since, as the rock is heated, differential thermal expansion causes fractures in it, allowing steam and fluids to flow through. SAGD may be twice as efficient as the older cyclic steam stimulation (CSS) process.

Many countries in the world have large deposits of oil sands, including the United States, Russia, and various countries in the Middle East. Oil sands may represent as much as two-thirds of the world's total petroleum resource, with at least 1.7 trillion barrels in the Canadian Athabasca Oil Sands, for example. At the present time, only Canada has a large-scale commercial oil sands industry, though a small amount of oil from oil sands is also produced in Venezuela. Because of increasing oil sands production, Canada has become the largest single supplier of oil and products to the United States. Oil sands now are the source of almost half of Canada's oil production, although due to the 2008 economic downturn work on new projects has been deferred, while Venezuelan production has been declining in recent years. Oil is not yet produced from oil sands on a significant level in other countries.

According to the Alberta Research Council, a typical Athabasca oil sand may contain 10 to 13 percent bitumen by weight, 3.5 to 8% percent water by weight, with remainder sand and clay. The electrical conductivity at 1 MHz may be 50 to 80 millimhos per meter, and the relative dielectric permittivity may be 9 to 20 (i.e. dimensionless). The connate water and its associated electrical conductivity makes oil sand an excellent electromagnetic heating susceptor, meaning it can heated with electric and magnetic fields at radio and microwave frequencies. U.S. Published Patent Application No. 2010/0078163 to Banerjee et al. discloses a hydrocarbon recovery process whereby three wells are provided, namely an uppermost well used to inject water, a middle well used to introduce microwaves into the reservoir, and a lowermost well for production. A microwave generator generates microwaves which are directed into a zone above the middle well through a series of waveguides. The frequency of the microwaves is at a frequency substantially equivalent to the resonant frequency of the water so that the water is heated.

Along these lines, U.S. Published Patent Application No. 2010/0294489 to Dreher, Jr. et al. discloses using microwaves to provide heating. An activator is injected below the surface and is heated by the microwaves, and the activator then heats the heavy oil in the production well. U.S. Published Patent Application No. 2010/0294488 to Wheeler et al. discloses a similar approach.

U.S. Pat. No. 7,441,597 to Kasevich discloses using a radio frequency generator to apply RF energy to a horizontal portion of an RF well positioned above a horizontal portion of an oil/gas producing well. The viscosity of the oil is reduced as a result of the RF energy, which causes the oil to drain due to gravity. The oil is recovered through the oil/gas producing well.

Unfortunately, long production times, for example, due to a failed start-up, to extract oil using SAGD may lead to significant heat loss to the adjacent soil, excessive consumption of steam, and a high cost for recovery. Significant water resources are also typically used to recover oil using SAGD, which impacts the environment. Limited water resources may also limit oil recovery. SAGD is also not an available process in permafrost regions, for example. Slow, conducted heating may be necessary initially to soften the formation in order to permit the convective flow of steam heat.

Moreover, despite the existence of systems that utilize RF energy to provide heating, such systems may suffer from inefficiencies as a result of impedance mismatches between the RF source, transmission line, and/or antenna. These mismatches become particularly acute with increased heating of the subterranean formation. Moreover, such applications may require high power levels that result in relatively high transmission line temperatures that may result in transmission failures. High common mode currents may also be generated on an outer conductor of a coaxial transmission line that is unbalanced and that feeds a balanced antenna, such as a dipole, for example. For example, common mode currents may lead to unwanted heating in the overburden or at the surface.

SUMMARY OF THE INVENTION

In view of the foregoing background, it is therefore an object of the present invention to provide a RF heating apparatus that is efficient and robust.

This and other objects, features, and advantages in accordance with the present invention are provided by an apparatus for heating a hydrocarbon resource in a subterranean formation having a wellbore extending therein. The apparatus comprises an RF source, and an RF antenna assembly configured to be positioned within the wellbore and coupled to the RF source. The RF antenna assembly comprises a first tubular dipole element having opposing proximal and distal ends, an RF transmission line extending through the proximal end of the first tubular dipole element and comprising an inner conductor, an outer conductor, and a dielectric therebetween. The inner conductor extends outwardly beyond the distal end of the first tubular dipole element. The outer conductor is coupled to the distal end of the first tubular dipole element. The RF antenna assembly includes a second tubular dipole element having opposing proximal and distal ends, with the proximal end being adjacent the distal end of the first tubular dipole element and being coupled to the inner conductor, and a tubular balun having the RF transmission line extending therethrough and opposing proximal and distal ends, with the distal end being adjacent the proximal end of the first tubular dipole element and the proximal end being coupled to the outer conductor. Advantageously, the apparatus may efficiently heat the hydrocarbon resources in the subterranean formation.

In some embodiments, the RF antenna assembly may comprise a tubular isolator having the RF transmission line extending therethrough and configured to couple together the tubular balun and the first tubular dipole antenna element. For example, the tubular isolator may comprise a cyanate ester composite material.

Additionally, the RF antenna assembly may further comprise a feed structure comprising a dielectric tube between the first and second tubular dipole antenna elements, a first connector coupling the outer conductor to the first tubular dipole element, and a second connector coupling the inner conductor to the second tubular dipole element. Another aspect is directed to a method for making an RF antenna assembly for heating a hydrocarbon resource in a subterranean formation having a wellbore extending therein. The method comprises providing a first tubular dipole element having opposing proximal and distal ends, and positioning an RF transmission line to extend through the proximal end of the first tubular dipole element. The RF transmission line comprises an inner conductor, an outer conductor, and a dielectric therebetween. The inner conductor extends outwardly beyond the distal end of the first tubular dipole element, the outer conductor to be coupled to the distal end of the first tubular dipole element. The method includes providing a second tubular dipole element having opposing proximal and distal ends, with the proximal end being adjacent the distal end of the first tubular dipole element and coupled to the inner conductor, and positioning a tubular balun to have the RF transmission line extending therethrough, the tubular balun having opposing proximal and distal ends, with the distal end being adjacent the proximal end of the first tubular dipole element and the proximal end to be coupled to the outer conductor.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
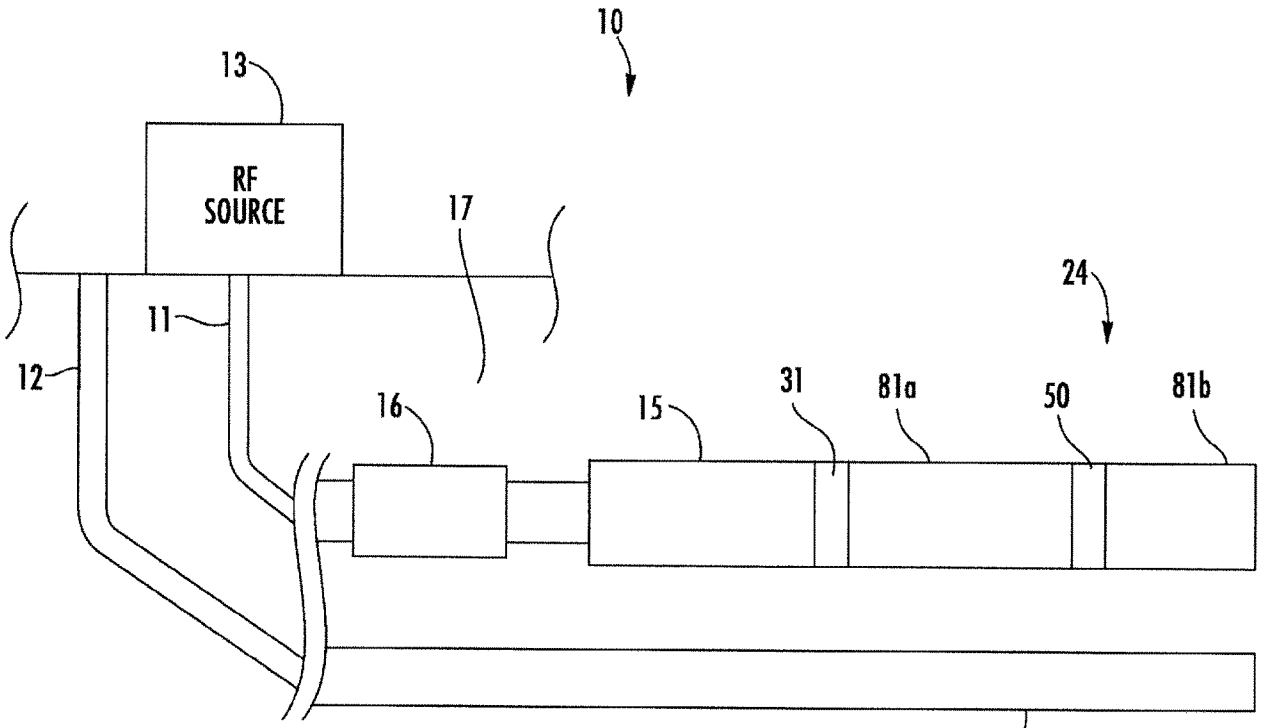
FIG. 1 is a schematic diagram of an apparatus, according to the present invention.
Figure 2:
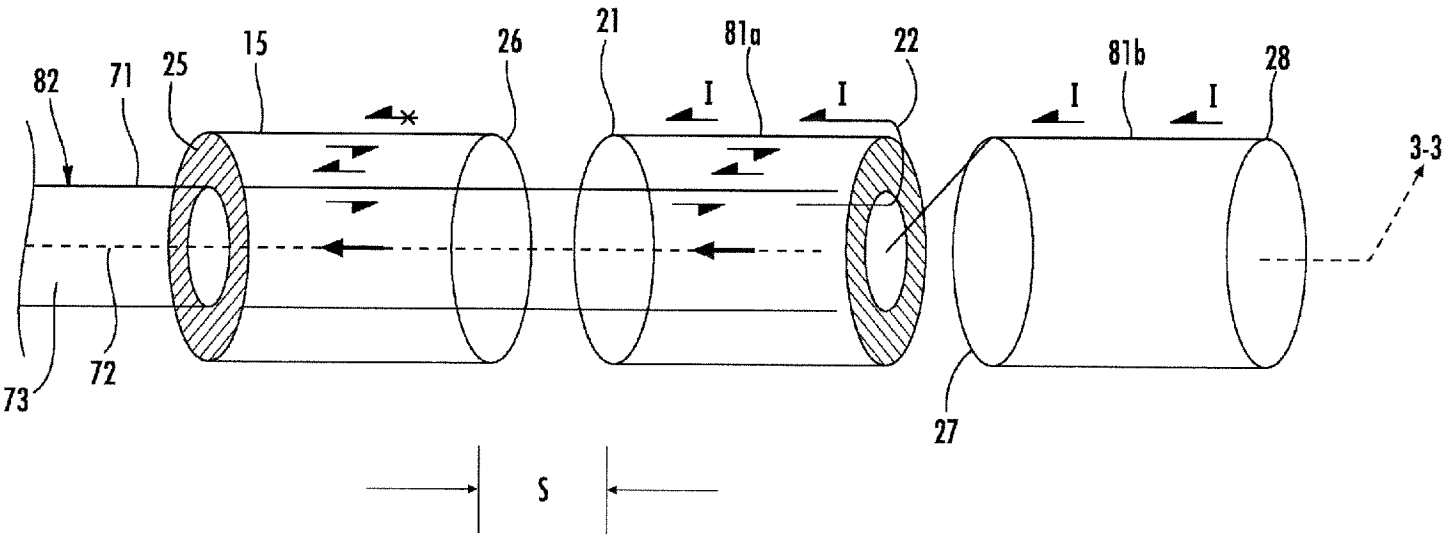
FIG. 2 is a schematic diagram of a portion of the RF antenna assembly from the apparatus of FIG. 1.

Referring initially to FIGS. 1-2, an apparatus 10 according to the present invention is now described. The apparatus 10 is for heating a hydrocarbon resource in a subterranean formation 17 having wellbores extending therein. The apparatus includes an injector well 11, and a producer well 12 extending into respective wellbores in the subterranean formation 17. The apparatus 10 comprises an RF source 13 coupled to the injector well 11, and the injector comprises an RF antenna assembly 24 to be positioned within the wellbore.

The RF antenna assembly 24 comprises a first tubular (sleeve) dipole element 81a having opposing proximal 21 and distal 22 ends. As used herein, distal means deeper into the wellbore while proximal means towards the surface. The RF antenna assembly 24 comprises an RF transmission line 82, such as a shielded RF transmission line or a coaxial RF transmission line, extending through the proximal end 21 of the first tubular dipole element 81a and comprising an inner conductor 72, an outer conductor 71, and a dielectric 73 therebetween. The inner conductor 72 extends outwardly beyond the distal end 22 of the first tubular dipole element 81a. The outer conductor 71 is coupled to the distal end 22 of the first tubular dipole element 81a, illustratively shown as a closed end connection, i.e., this end of the tube is capped. The RF antenna assembly 24 includes a second tubular (sleeve) dipole element 81b having opposing proximal 27 and distal 28 ends. The proximal end 27 of the second tubular dipole element 81b is adjacent the distal end 22 of the first tubular dipole element 81a and is coupled to the inner conductor 72. The RF antenna assembly 24 includes a tubular (sleeve) balun 15 having the RF transmission line 82 extending therethrough and opposing proximal 25 and distal 26 ends. The distal end 26 of the tubular balun 15 is adjacent the proximal end 21 of the first tubular dipole element 81a, and the proximal end 25 of the tubular balun 15 is coupled to the outer conductor 71, illustratively shown as a closed end connection.

In the illustrated embodiment, the RF antenna assembly 24 comprises a tubular isolator 31 having the RF transmission line 82 extending therethrough and configured to couple together the tubular balun 15 and the first tubular dipole antenna element 81a. The tubular isolator 31 provides an electrical discontinuity in the RF antenna assembly 24, at which RF electrical currents are supplied to the first and second tubular (sleeve) dipole elements 81a, 81b. For example, the tubular isolator 31 may comprise a cyanate ester composite material (e.g. quartz enhanced), polyimide, or to another suitable dielectric composite that has mechanical strength for structural integrity, and absorbs minimal amounts of radiated energy.

Advantageously, the tubular balun 15 is tuned to prevent RF energy from penetrating uphole to the overburden and to concentrate heating downhole towards the hydrocarbon resources. As the subterranean formation 17 heats, its electrical properties may change. So, the dipole tuning may drift away from balun tuning. The overburden may not heat, so the balun 15 tuning may not drift all. Separate tubular balun 15 and first tubular dipole antenna element 81a allow independent tuning to manage this tuning drift, i.e. there is a split of the tuning of the tubular balun and the antenna to deal with the different behavior of the overburden and the hydrocarbon resources. In short, the region between the first tubular dipole antenna element 81a and the tubular balun 15 is not heated.

So a method of the invention is the split tuning of the balun and the antenna to deal with the different behavior of the overburden. In the split tuning method: 1) the resonance of the first and second tubular dipole elements 81a, 81b is allowed to drift with heating; 2) RF source 13 frequency is varied to track the drilling resonant frequency of the first and second tubular dipole elements 81a, 81b; and 3) tubular balun 15 resonant frequency is adjusted by a tubular balun 15 tuning system, such as that described in co-pending patent application titled: "SYSTEM INCLUDING TUNABLE CHOKE FOR HYDROCARBON RESOURCE HEATING AND ASSOCIATED METHODS," U.S. patent application Ser. No. 13/657,172 filed Oct. 22, 2012, the contents of which are hereby incorporated by reference in their entirety.

Additionally, the apparatus 10 comprises a tubular ferrite choke 16 surrounding the RF transmission line 82 and spaced apart from the proximal end 25 of the tubular balun 15. The first and second tubular dipole elements 81a-81b have a desired operating frequency, and each of the first tubular dipole element, the second tubular dipole element, and the tubular balun 15 may have a length corresponding to +/−10% of a quarter of a wavelength of the desired operating frequency, i.e. the first and second tubular dipole elements form a half-wave dipole antenna, as illustratively noted in FIG. 2. Moreover, as also illustrated in FIG. 2, the current flows in the RF antenna assembly 24 are shown with arrows. Advantageously, the current from the outer conductor 71 does not penetrate the tubular balun 15.

In FIG. 2, the arrows I denote the flows of RF current at an instant in time, at a preferred electrical size, where the first tubular dipole element 81a is one quarter wavelength ($\lambda/4$) in length and the second tubular dipole element 81b is also one quarter wavelength ($\lambda/4$) in length. The tubular dipole elements 81a-81b carry a sinusoidal electric current that converges and diverges from tubular isolator 31. The internal surfaces of the tubular balun 15 and the first tubular dipole element 81a both comprise coaxial stubs, which carry internal currents that do not provide subterranean formation 17 heating, but are otherwise useful to provide common mode current suppression and underground tuning components. The present embodiments are not so limited however as to only be operated at ¼ wavelength electrical dimensions for the first and second tubular dipole elements 81a, 81b.

Figure 3:
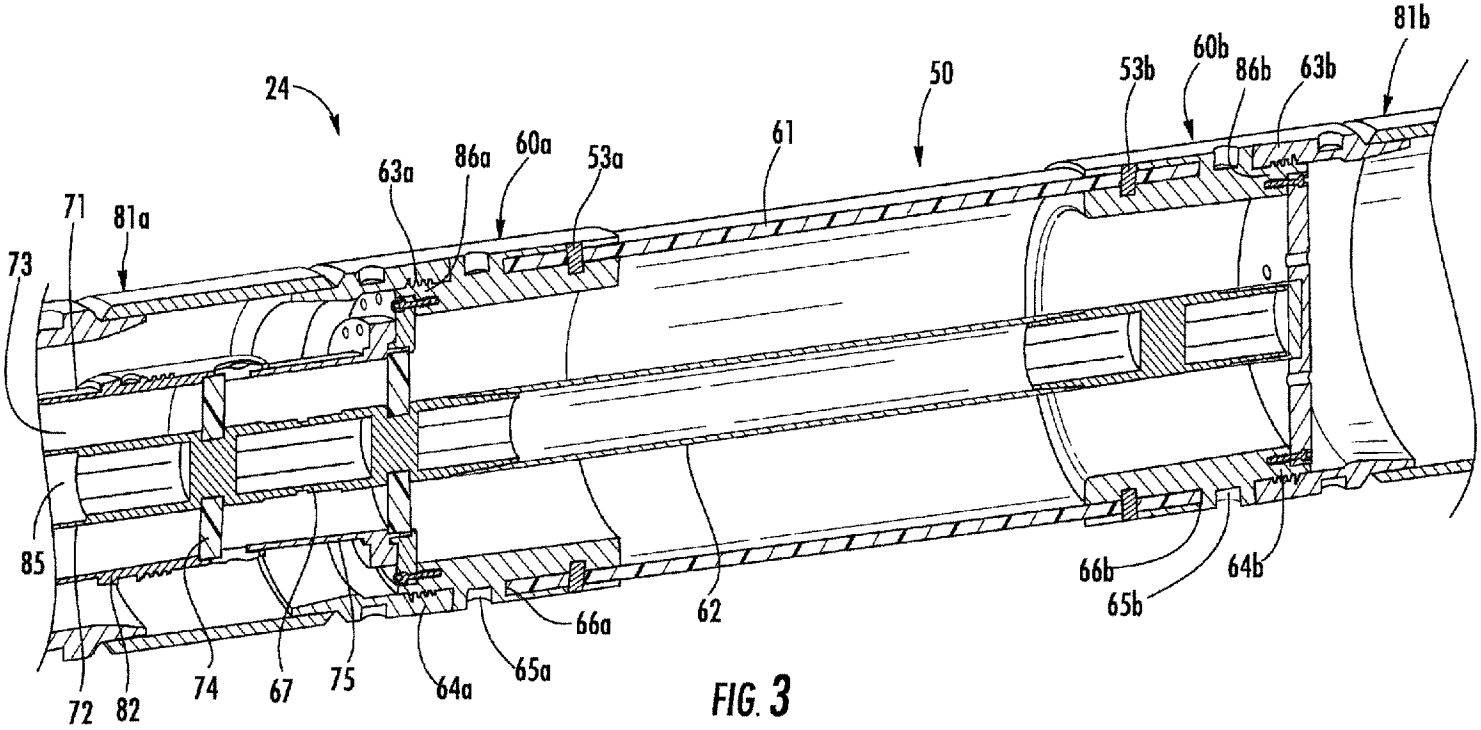
FIG. 3 is a cross-section view of a portion of one embodiment of the feed structure from the apparatus of FIG. 1 along line 3-3.

Referring now additionally to FIG. 3, the RF antenna assembly 24 further comprises a feed structure 50 coupling together the first and second tubular dipole antenna elements 81a-81b and electrically coupling the RF transmission line 82 and the first and second tubular dipole antenna elements. The feed structure 50 includes a dielectric tube 61 between the first and second tubular dipole antenna elements 81a-81b, a first connector 60a coupling the outer conductor 71 to the first tubular dipole element, and a second connector 60b coupling the inner conductor 72 to the second tubular dipole element. For example, the dielectric tube 61 may comprise a cyanate ester composite material (e.g. quartz enhanced) or another suitable dielectric composite that has mechanical strength for structural integrity, and absorbs minimal amounts of radiated energy.

In the illustrated embodiment, the first and second connectors 60a-60b include a plurality of tool-receiving recesses 65a-65b on an outer surface thereof. The tool-receiving recesses 65a-65b are illustratively circular in shape, but in other embodiments, may comprise other shapes, such as a hexagonal shape. The tool-receiving recesses 65a-65b are provided to aid in using torque wrenches in assembling the antenna assembly 24. The RF transmission line 82 is affixed to the first connector 60a with a plurality of bolts 53a-53b. Of course, other fasteners may be used.

In the illustrated embodiment, the inner conductor 72 comprises a tube defining a first fluid passageway 85 therein. The outer conductor 71 is illustratively spaced from the inner conductor 72 to define a second fluid passageway 73. The passageways 85, 73 permit the flow of selective gases and fluids that aid in the hydrocarbon recovery process.

The feed structure 50 includes an intermediate conductor 62 extending within the dielectric tube 61 and coupling the inner conductor 72 to the second connector 60b. For example, the intermediate conductor 62 illustratively comprises a conductive tube of a material comprising, e.g., copper, aluminium. Moreover, the RF transmission line 82 includes an inner conductor coupler 67 for coupling the inner conductor 72 to the intermediate conductor 62, and first and second dielectric spacers 74-75, each comprising a bore therein for receiving the inner conductor coupler. Additionally, the first and second tubular dipole elements 81a-81b each comprises a threaded end 63a-63b, and the first and second connectors 60a-60b each comprises a threaded end 86a-86b engaging a respective threaded end of the first and second tubular dipole elements for defining overlapping mechanical threaded joints 64a-64b. The threaded ends 63a-63b of the first and second tubular dipole elements 81a-81b each comprises a mating face adjacent the first and second connectors 60a-60b. The mating face includes a threading relief recess to provide good contact at the outer extreme of the first and second connectors 60a-60b. The overlapping mechanical threaded joints 64a-64b provide for a hydraulic seal that seals in fluid and gases within the antenna assembly 24.

Each of the first and second connectors 60a-60b comprises a recess 66a-66b for receiving adjacent portions of the dielectric tube 61. In the illustrated embodiment, each recess comprises a circular slot that is circumferential with regards to the first and second connectors 60a-60b. Moreover, all edges in the illustrated embodiment are rounded, which helps to reduce arching in high voltage applications.

Another aspect is directed to a method for making an RF antenna assembly 24 for heating a hydrocarbon resource in a subterranean formation 17 having a wellbore extending therein. The method comprises providing a first tubular dipole element 81a having opposing proximal and distal ends 21, 22, and positioning an RF transmission line 82 to extend through the proximal end of the first tubular dipole element. The RF transmission line 82 comprises an inner conductor 72, an outer conductor 71, and a dielectric 73 therebetween. The inner conductor 72 extends outwardly beyond the distal end 22 of the first tubular dipole element 81a, the outer conductor 71 to be coupled to the distal end 22 of the first tubular dipole element. The method includes providing a second tubular dipole element 81b having opposing proximal and distal ends 27-28, with the proximal end being adjacent the distal end 22 of the first tubular dipole element 81a and to be coupled to the inner conductor 72, and positioning a tubular balun 15 to have the RF transmission line 82 extending therethrough, the tubular balun having opposing proximal and distal ends 25-26, with the distal end being adjacent the proximal end 21 of the first tubular dipole element and the proximal end to be coupled to the outer conductor.

A theory of operation for the apparatus 10 will now be provided. The first and second tubular dipole elements 81a, 81b form the half elements of a dipole antenna that is linear, e.g. line shaped for the divergence of electric current. An inset feed is provided by concentrically locating the RF transmission line 82 inside the first tubular dipole element 81a, advantageously allowing the RF well heater to be configured in a single hole. Electrical charge is separated across the driving discontinuity of the tubular isolator 31, which in turns causes a current flow along the first and second tubular dipole elements 81a, 81b. Initially, if uninsulated from the subterranean formation 17, the first and second tubular dipole elements 81a, 81b act as electrodes to supply electrical currents to the subterranean formation, which may then be the predominant mode of heating. The initial extension of the RF electric currents axially along the first and second tubular dipole elements 81a, 81b may be proportional to the RF skin depth or slightly more than the RF skin depth. The RF skin effect therefore initially concentrates the resistive, Joule effect heating to the vicinity of the tubular isolator 31. The connate water in the subterranean formation 17 quickly turns to steam, so a steam saturation zone or "steam bubble" forms there. In this steam saturation zone, there may be rock, sand, hydrocarbons and vapor phase water, but no liquid water. The steam bubble may be elongated as it grows from the center outwards following along the first and second tubular dipole elements 81a, 81b. In particular, at the steam bubble boundary along the first and second tubular dipole elements 81a, 81b, where the liquid water still touches the first and second tubular dipole elements, there are hotspots of heat. Thus, two moving hotspots of heat travel from tubular isolator 31 outwards, the first traveling along the first tubular dipole element 81a, and the second hotspot traveling along the second tubular dipole element 81b. Eventually, the moving hotspots reach the ends of the first and second tubular dipole elements 81a, 81b, resulting in the first and second tubular dipole elements 81a, 81b becoming electrically insulated from the subterranean formation 17 in a steam saturation zone. Steam is an electrical insulator whereas liquid water is an electrical conductor. When insulated from the subterranean formation 17, the energies delivered to the subterranean formation by the RF antenna assembly 24 automatically shift from conducted electric currents to radiation of electric and magnetic fields. Thus the heating provided by the present embodiments is reliable.

Continuing the theory of operation, the electric fields transduced from the insulated first and second tubular dipole elements 81a, 81b capacitively couple the currents from those elements through the steam bubble and into the liquid water regions beyond. In other words, first and second tubular dipole elements 81a, 81b are in a sense akin to capacitor plates. When the electric fields reach the connate liquid water, they cause electrons to flow there, and this induced current flow heats the water resistively by Joule effect. Thus, capacitive coupling by transduced and radiated electric fields provides a means of electrical resistance heating in the subterranean formation 17 without the need for electrode like conductive contact. This may be advantageous as electrode contact in hydrocarbon formations may be unreliable.

The diverging and oscillating flow of RF electric currents along the first and second tubular dipole elements 81a, 81b also transduce and radiate magnetic fields into the subterranean formation 17. As the magnetic fields expand through the connate water regions of the subterranean formation 17, they initiate the flow of Eddy electric currents that heat the subterranean formation 17 by the Joule effect. Thus, magnetic field heating occurs by a compound, inductive process of starting with RF current flow on the first and second tubular dipole elements 81a, 81b, followed by magnetic field expansion according to Ampere's Law, followed by Eddy current flow according to Lent's Law, and finally formation heating by Joule effect. In a simple sense, induction heating is akin to the RF antenna 24 being a current transformer primary winding and the Eddy currents in the subterranean formation 17 being current transformer secondary windings, although these "windings" do not exist in a traditional sense. It may be typical that a wire coil is necessary to cause magnetic induction heating, but a linear, line shaped electric conductor also provides a useful, curling magnetic field for RF heating. The linear, line-shaped dimensions of the present embodiments are more practical to install in the earth than a large diameter coil.

Continuing the theory of operation, if the first tubular dipole element 81a is one quarter wavelength ($\lambda/4$) in length, and the second tubular dipole element 81b is also one quarter wavelength ($\lambda/4$) in length, magnetic field induction heating may be more prevalent near the center of the RF antenna assembly 24, and electric field induction heating more prevalent near the ends of the first and second tubular dipole elements 81a, 82a. This is because the current and voltage distribution may be sinusoidal with current maxima at the center of the dipole and voltage maxima at the ends of the dipole. The electric and the magnetic fields provided by the RF antenna assembly 24 work together to provide a continuous heated area which may be an oblate spheroid or football shape. At close ranges to the dipole, less than about $\lambda_{media}/2\pi$, the nature of the magnetic and electric fields may be those of reactive near fields, and at extended ranges from the dipole, radii greater that about $\lambda_{media}/2\pi$, the transduced electric and magnetic fields may be those of a radio waves. Advantageously, both reactive near fields and the radio waves provide heating and the radio waves allow the heating to continue to virtually unlimited ranges. RF heating may not rise like steam convection heating, so with RF heating caprock may not be required over the payzone.

Furthermore, realized temperatures underground are a function of the applied RF power in kilowatts (KW), the heating duration in hours H, the heated mass in kg, and the specific heat of the subterranean formation 17 in Joules per kilogram degree Kelvin (J/kg·K) or KW/kg·K. The penetration or radial thermal gradient surrounding the RF antenna assembly 24 is a function of both subterranean electrical conductivity in mhos/meter and of electromagnetic field expansion. Specifically, where r is the radius radially away from the axis of the RF antenna assembly 24, a $1/r^2$ RF power gradient must occur away from a insulated RF antenna 24 due to the spherical spreading of the RF fields, plus a dissipative RF power gradient must occur due to the RF heating, which may be between $1/r^3$ to $1/r^5$ depending on subterranean formation 17 electrical conductivity. Thus, the combined radial RF power gradient, spreading loss plus dissipative loss, may be $1/r^5$ to $1/r^7$. A practical example is that the instantaneous half depth of penetration of the electromagnetic heating energies radially away from the apparatus 10 in rich oil sand of 0.005 mhos/meter electrical conductivity may be about 20 inches. This is considerably superior to the initial, instantaneous penetration of convected heating, which is zero or nearly zero. An RF heated zone can grow in size much more quickly than a steam injection heated zone. Convective flow is not needed for RF heating to occur, and RF heating can heat impermeable structures, such as shale strata (and even fracture the shale strata). Indeed, speed is a well known attribute of RF heating in general. The realized temperatures T of the RF heating may be any between the formation temperature prior to the commencement of the heating, to the boiling point of the connate subterranean water at reservoir conditions, which may be 200° C. or more depending on depth and pressure. Thus the realized temperatures with the RF heating regulate themselves so as not to exceed the boiling point of water at reservoir conditions. This advantageously avoids hydrocarbon coking which may reduce subterranean formation permeability. RF heating may also prevent the deposit of varnishes on the well apparatus when live oils are produced, as the oils will not be cooling as they drain.

The present embodiments are not so limited to require forming a steam saturation zone underground, nor do they require that the subterranean temperatures reach the boiling point of water. For instance, the realized temperatures may be reduced by reducing RF power levels. Another way to reduce realized temperatures, and a method of the present disclosure, is to inject critical fluids, such as alkane hydrocarbons into the subterranean formation 17 and allow the RF heating to drive them. Injected alkanes may function to thermally regulate the extraction process at lower temperatures and act as a solvent to thin payzone hydrocarbons. Alkane molecules for injection may preferentially include propane, butane, pentane, and hexane, which may boil below the boiling point of water. With alkane injection, the number of carbons in the alkane molecule may adjust the alkane boiling point, which in turn may adjust the underground temperatures necessary to extract the subterranean formation 17 hydrocarbons. The RF antenna assembly 24 may inject the alkane solvent or a separate injector well may be provided, such as an infill well.

Moreover, although an advantageous mode of subterranean heating has been identified as Joule effect, the present embodiments are not so limited, and the introduced electric fields may also cause dielectric heating. Dielectric heating especially occurs due to the interaction of the electric fields with polar molecules, particularly connate water. The combination of Joule effect and the dielectric heating allow the present embodiments to operate effectively over a broad range of radio frequencies, even near the dielectric heating minima frequency for water, which occurs in the radio spectrum near 30 MHz. Preferred radio frequencies for the present embodiments may therefore be between 40 Hertz and 40 Megahertz. The higher frequencies may supply more load resistance while lower frequencies may supply somewhat greater penetration. It may be advantageous to operate the apparatus 10 at a resonance frequency, fundamental or harmonic, of the dipole that is formed by the first and second tubular dipole elements 81a, 81b, as resonant operation may avoid a reactive or high power factor load, for instance. Operation at harmonic resonance frequencies may provide resonant operation with alternative load resistances that may advantageously be higher or lower than the fundamental frequency load resistance.

Continuing the theory of operation, hydrocarbons and water often occur together underground. When they do, RF electric and magnetic fields will heat subterranean water much faster than associated hydrocarbons. In the case of oil sand, the connate pore water in oil sand RF generally heats more than 100 times faster than the bitumen. Thus, the pore water becomes hot first and then it conductively heats the bitumen films on the pores. As the sand grains are many, the water pores small, and the bitumen pore films having substantial area and contact with the pore water, the rise in bitumen temperature closely paces the pore water temperature rise. The bitumen may be melted and mobilized from an expanding thermal front surrounding the apparatus 10 and if the underground boiling temperatures are reached, the steam from the RF heated connate water may provide an additional driving to force to mobilize the warmed and thinned bitumen. Thus apparatus 10 may produce hydrocarbons and connate water together at same time. If alkane solvents are injected, they may also provide a driving force to mobilize bitumen. Of course, hot water or injected steam can be provided as a pressure drive on the hydrocarbons, and gravity drainage may also be incorporated. The speed and penetration of RF heating is much greater than that of steam heating, so RF electromagnetic heating provides increased present value.

Electrical start up methods for the apparatus 10 will now be discussed. The RF antenna assembly 24 may be configured to initially provide conductive electrical contact with the subterranean formation 17 or it may be electrically insulated from the formation initially. Both the bare and insulated approaches will be successful due to the many heating modes mentioned previously. However, an uninsulated RF antenna assembly 24 may initially present a low resistance and high voltage standing wave ratio (VSWR) until the connate water boils off, so an electrical start up my be needed. Various methods of start up are anticipated. One exemplary method of startup, winch has been tested, has been to supply RF power into the low load resistance/high VSWR at reduced RF power until the water boiled off the surfaces. Most RF power sources will manage ill conditioned load impedances at low power, and only low power is needed to boil the water off.

Another start up method is to elevate frequency until an increased load resistance/low VSWR is obtained, as raising the frequency increases the load resistance when there is liquid water contact. Another startup method is to initially apply direct current (DC) to the RF antenna assembly 24 to boil the connate water off the antenna surfaces, as VSWR losses do not occur at DC. Of course, the various methods to insulate the RF antenna assembly 24 also exist, such as filling the hole with a nonconductive material, eliminating the need for an electrical startup all together.

The tubular balun 15 may be provided to control or prevent common mode currents. Here, a common mode current is defined as an electrical current flowing on the outside of the RF transmission line 82. This may occur as the outer conductor 71 can support separate electrical current flows on its inside and outside surfaces due to RF skin effect. Without the tubular balun 15 then, stray capacitance between the uphole end of the first tubular dipole antenna elements 81a and the outer conductor 71 may convey the RF heating currents uphole, through overburden, and even to the surface. This would be unwanted as heating in overburden may be uneconomic. RF heating at the surface may melt permafrost or even cause a personnel safety hazard. The tubular balun 15 prevents these unwanted conditions by providing a high electrical resistance across its open end at radio frequencies. The high electrical resistance across the open mouth of the tubular balun 15 occurs due to the short circuit at the closed end of the tubular balun 15 being referred to as an open circuit by the ¼ wavelength (or a odd harmonic of ¼ wavelength) length of the tubular balun. The short circuit end is referred as an open circuit (or nearly so) at the open end due the cosine distribution of current and sine distribution of voltage along the inside the tubular balun 15. A preferred length of the tubular balun 15 is given by:

$$L=0.25n\lambda/\sqrt{\mu_r\epsilon_r};$$

where:

L=the physical length of the tubular balun 15, in meters;

n=odd integers, e.g. 1, 3, 5 . . . ;

$\lambda$=wavelength in meters=speed of light in meters per second/radio frequency in Hertz;

$\lambda_r$=relative magnetic permeability of fill inside tubular balun 15, if any; and $\epsilon_r$=relative dielectric permittivity of fill inside tubular balun 15, if any.

Figure 4:
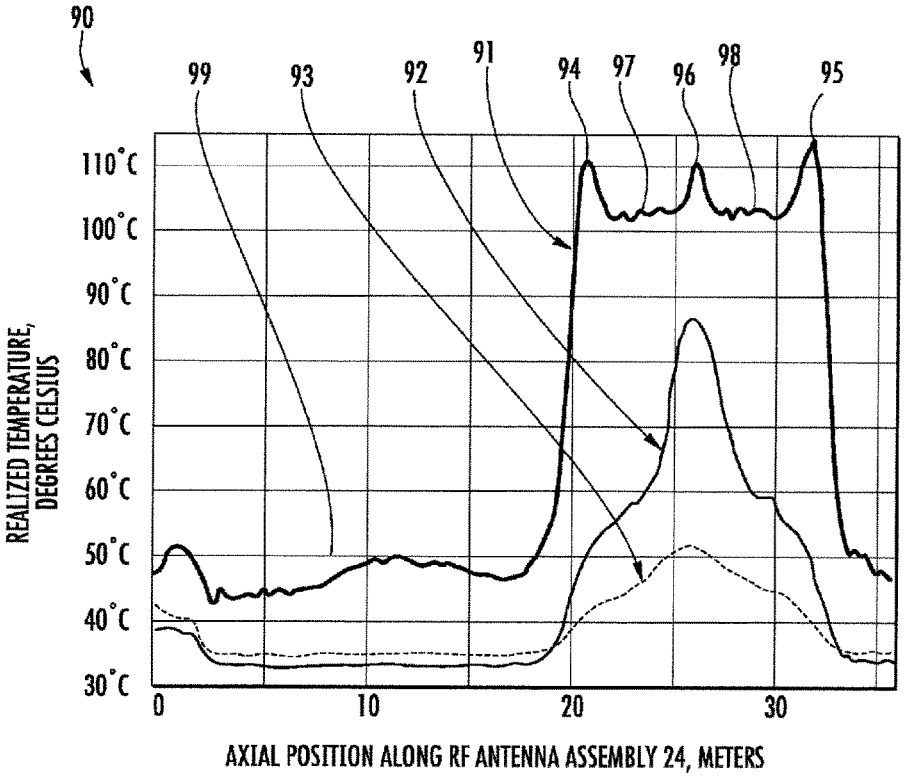
FIG. 4 is a diagram showing the measured heating performance of an example embodiment of the apparatus from FIG. 1, in sandy soil.

Referring now additionally to FIG. 4, diagram 90 illustrates the measured heating performance of an example embodiment of the apparatus 10 in a hill of sandy, moist soil which corresponded to a subterranean formation 17. The sandy soil did not contain hydrocarbons but the electrical and thermal characteristics of the sandy soil were similar to those of rich oil sand, and in specific, the sandy soil had an electrical conductivity of between $\sigma$=0.003 mhos/meter and 0.0005 mhos/meter. The moist sand test was instrumented with temperature and pressure sensors at different distances from the RF antenna assembly 24. In particular, the diagram 90 illustrates performance at a time point of 44 hours during a 5 day RF heating staging test.

Curve 91 shows the realized temperature profile immediately aside the RF antenna assembly 24 as a function of axial position along the RF antenna assembly. In the diagram 90, the RF antenna assembly 24 exited the sand hill at an axial position of 0 meters, and the downhole end of the RF antenna assembly 24 was at 35 meters. Curves 92-93 show the temperature profiles at 1 meter and 2.5 meters radial distance away film the RF antenna assembly 24. During the staging test, the example embodiment of the apparatus 10 radiated 86 kilowatts (KW) of power with a voltage standing wave ratio of 3.06:1. Temperature peaks 94, 95 were caused by electric fields at the ends of the first and second tubular dipole antenna elements 81a-81b, which capacitively coupled electric currents into the moist sand nearby. Temperature peak 96 corresponded to the location of the tubular isolator 31 as locally increased electric field strengths also existed there. Heating at local minimas 97, 98 was mostly due to magnetic near fields from the first and second tubular dipole antenna elements 81a-81b causing induced eddy currents in the subterranean formation 17. Likewise, the longer range heating at the 1 and 2.5 meter radii were also caused by magnetic fields from first and second tubular dipole antenna elements 81a-81b.

In general, magnetic field beating predominated at greater radial distances. Note that unwanted uphole RF heating was effectively prevented by the tubular balun 15, so the RF heating was concentrated around the first and second tubular dipole antenna elements 81a, 81b, located between 5 and 18 meters position. Temperature rise near the surface, between about 0 and 5 meters axial position, was due to the sun and warm rain, which occurred during the test. At the time the test was terminated, the RF heated zone was continuing to grow in size and the heating could have been extended. After the RF heating test, a hole was dug into the top of the sand pile and steam rose there. An infrared/thermal camera clearly showed the heating region of the sand pile from a distance. An RF heated zone of virtually any required size may be created by the RF antenna assembly 24.

The apparatus 10 was later deployed in an undisturbed bench of rich of oil sand, which contained bitumen. The intent of the oil sand test was to demonstrate RF heating only, so a producer well and injected solvents were not provided. However, the borehole was much larger in diameter than the apparatus 10 and, after RF heating, the free space filled with oil and leakage had to be contained. The driving force to mobilize the produced oil was created by the RF fields, as no steam was injected. The heating due to the electromagnetic fields mobilized the oil radially inwards. Table 1 below describes the measured results of the oil sand heating test with the apparatus 10.

TABLE 1

Oil Sand Test Results

| Parameter | Value |
|---|---|
| Subterranean formation 17 | Undisturbed bench of rich oil sand/bitumen ore. |
| Ore electrical conductivity | 0.002 to 0.01 mhos/meter |
| RF antenna assembly 24 orientation | Horizontal |
| RF antenna assembly 24 electrical type | Double tuned half wave dipole |
| Borehole diameter | 0.50 meters |
| First and second tubular dipole element diameter 81a, 81b | 0.15 meters |
| First and second tubular dipole element length 81a, 81b | 10.6 meters each |
| First and second tubular dipole element length 81a, 81b material | Aluminum |
| Tubular balun 15 length | 10.6 meters |
| Tubular balun 15 diameter | 0.15 meters |

TABLE 1-continued

Figure 6:
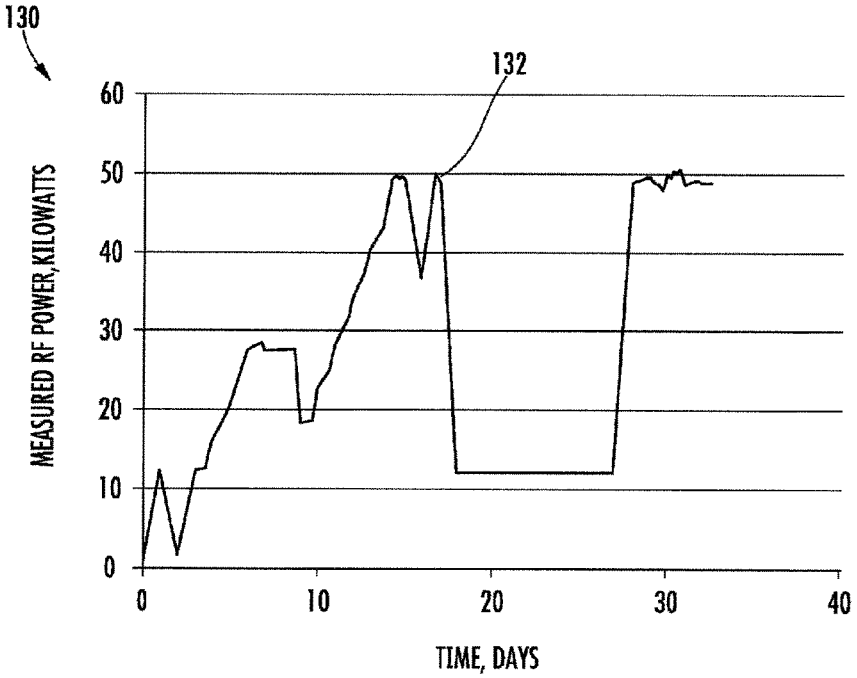
FIG. 6 is a diagram showing the measured RF power applied to an example embodiment of the apparatus of FIG. 1.

| Oil Sand Test Results | |
|---|---|
| Parameter | Value |
| Tubular balun 15 diameter material | Aluminum |
| Dielectric conduit diameter | 0.33 meters |
| Outer casing | The apparatus 10 was located inside a nonconductive dielectric conduit |
| Outer casing material | Isocyanurate polymer with spun glass fibers |
| RF transmission line 82 | Coaxial, formed of concentric tubing |
| RF transmission line 82 characteristic impedance | 50 Ω |
| RF transmission line 82 cooling and inerting | Recirculated dry nitrogen |
| Radio frequency | 6.78 MHz, held constant throughout the test |
| Electromagnetic heating mode | Induction of electric currents by application of electric and magnetic fields |
| Primary heating mechanism | Joule effect in connate water |
| Secondary heating mechanism | Dielectric heating in connate water |
| Solvent injection | None |
| Radiated RF power | 0 to 50 kilowatts, varied throughout the test, see FIG. 6 |
| Applied RF waveform | Sinusoid (no modulation or pulses) |
| RF source 13 | Modified shortwave broadcast transmitter |
| RF source 13 active devices | Tetrode vacuum tube, Eimac 4CV100,000C |
| Duration of RF heating | 35 days |
| Initial temperature of oil sand | 4 to 10 degrees Celsius |
| Ending temperature of oil sand | 120 degrees Celsius near the RF antenna assembly 24, plus radial thermal gradient beyond |
| Producer well | Not provided |
| Produced oil quantity | 600-1000 gallons, estimated |

Of course, more oil could have been produced if producer well were provided, solvents injected, steam introduced, etc.

Continuing the description of the oil sand test of the apparatus 10, a nonconductive conduit was used to house the RF antenna assembly 24. The nonconductive dielectric conduit was provided at the oil sand test to easily slide the RF antenna assembly 24 in and out d the earth, especially after heating had occurred. Thus, no electric currents were applied to the hydrocarbon ore by electrode contact. A nonconductive conduit is not required for the operation of the RF antenna assembly 24.

Figure 5:
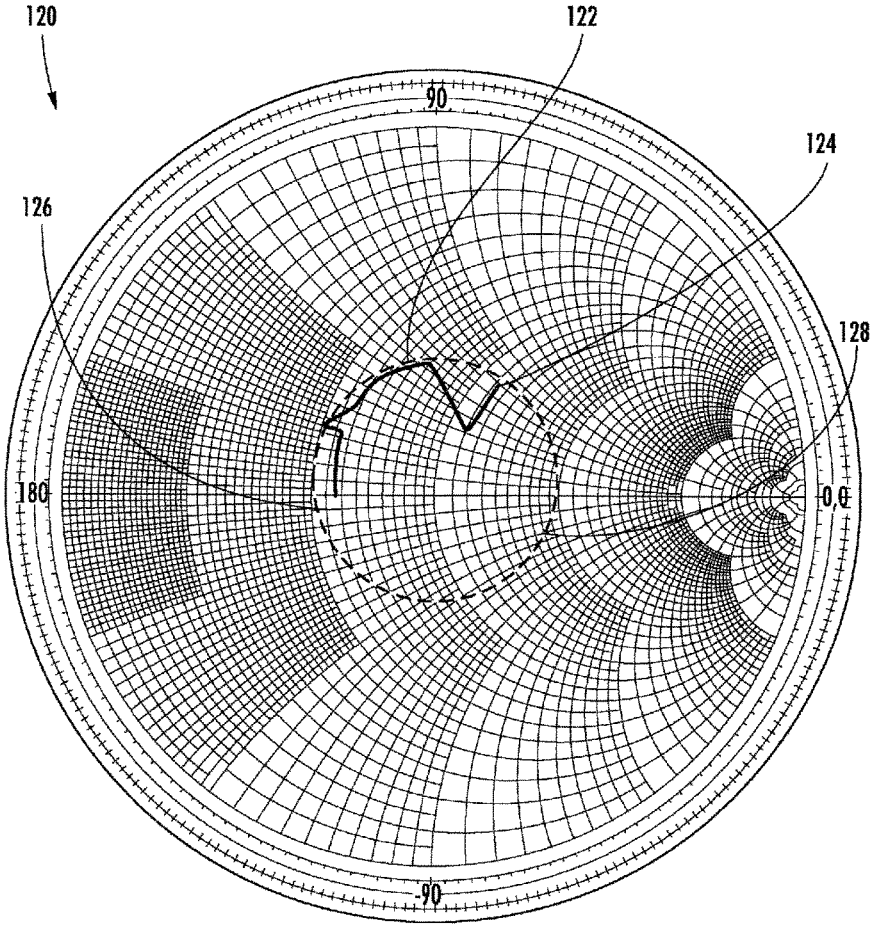
FIG. 5 is a Smith diagram illustrating the measured load impedance of an example embodiment of the apparatus from FIG. 1.

Furthermore, referring now additionally to FIGS. 5-6, diagram 120 shows the measured electrical impedance of the RF antenna assembly 24 as the RF heating progressed. The diagram 120 is in a polar format known as a Smith Chart©, and it shows the measured electrical load that the RF antenna assembly 24 presented to the RF source 13 at the RF power source 13, thus the phase delay of the RF transmission line 82 is included in the measured impedance trace 122. The data points that make up trace 122 represent different points in time, radio frequency was held constant throughout the test. Point 124 was the initial impedance prior to the start of the RF heating, and it measured to be Z=59+32j ohms or the equivalent of 59 ohms of resistance in series with 32 ohms of inductive reactance. Point 126 is the impedance at the conclusion of the RF heating on day 32, and it was measured to be Z=29−4j ohms or the equivalent of 29 ohms of resistance in series with 4 ohms of capacitive reactance. Circle 128 encloses the region of the Smith Chart having a 2 to 1 VSWR or less.

Thus, the RF antenna assembly 24 advantageously maintained a VSWR of 2 to 1 or less throughout the RF heating, providing a useful load for the RF source 13 whose impedance mismatch loss was 4 percent or less. The RF antenna 24 is a highly efficient RF heating applicator. More than 95 percent of the RF power shown in FIG. 6 was delivered into the oil sand. The RF antenna assembly 24 impedance was measured by momentarily turning off the RF power source 13 and connecting the vector network analyzer to the RF antenna 24.

Continuing the oil sand test description, FIG. 6 graph 130 and trace 132 depicts the RF power level that was applied to the RF antenna assembly 24 over time. It became necessary to reduce the RF power level to reduce the amount of oil being produced. At the 50 kilowatt power level, the applied power metric was 2.4 kilowatts/meter of well length.

Figure 7:
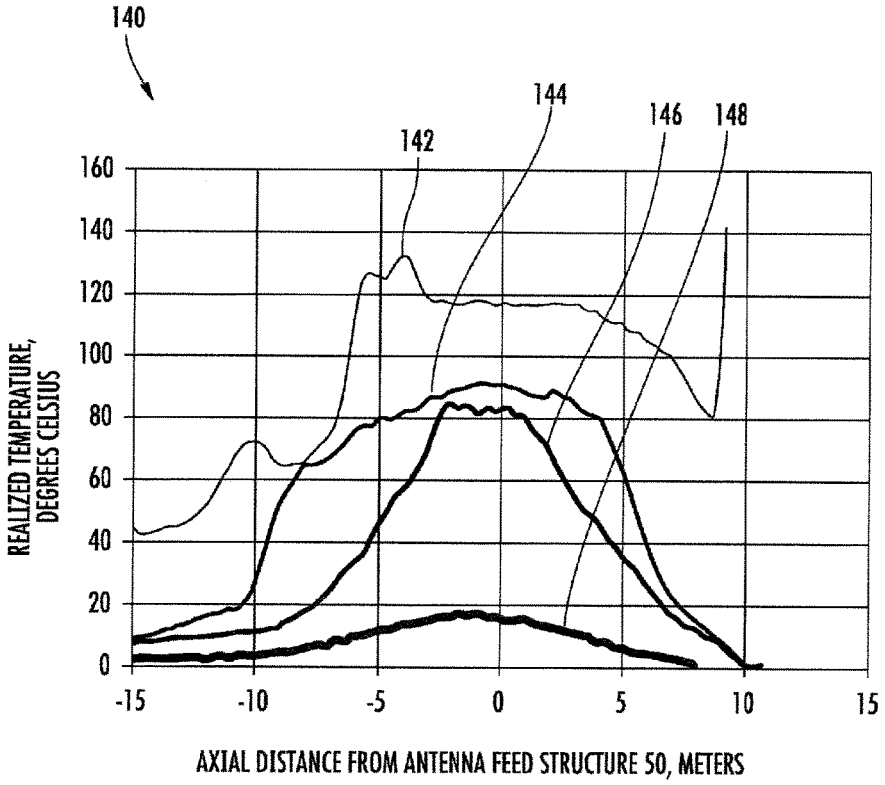
FIG. 7 is a diagram showing the realized subterranean temperatures produced by an example embodiment of the apparatus of FIG. 1 while heating oil sand.

Referring now additionally to FIG. 7, diagram 140 illustrates the measured realized subterranean temperatures at the completion of the oil sand test of the example embodiment of the apparatus 10. Curve 142 shows the realized temperature profile immediately aside the RF antenna assembly 24, curve 144 is for the realized temperature at 1.5 meters radial distance away from the axis of the RF antenna assembly 24, curve 146 is for 1.75 meters radial distance, and curve 148 is for 3.5 meters radial distance. 0 meters in the X axis corresponds to antenna feed structure 50, e.g., the center of the dipole.

Continuing the oil sand test description, the nature of the RF produced hydrocarbon was atypical of the bitumen produced in the oil sand by other process, such as the Clark hot water process or SAGD process. Specifically, RF heating produced a paraffinic oil of considerably reduced viscosity. As will be appreciated, higher paraffin content hydrocarbon resources may be considered already upgraded or at or near pipeline grade as they are thinned with respect to hydrocarbon resources with a higher asphalt content, for example. Paraffinic hydrocarbon resources are relatively shiny and transparent or partially so, i.e., a wax. In contrast, bitumen typically produced via strip mining and a hot water bath is jet black and almost solid at −12° C., for example. Higher paraffin content hydrocarbon resources may further be used for refining higher octane gasoline, for example. Thus, increased paraffin content may be valued higher than other types of hydrocarbon resources.

Table 2 compares measured properties of RF produced oil with those of typical of Clark hot water process bitumen.

TABLE 2

| Comparison Of RF Produced Oil With Clark Process Bitumen | | |
|---|---|---|
| Method | Mining Process, Typical | RF Process, Measured |
| Hydrocarbon Ore Production Technique | Rich Oil Sand Mining, followed by Clark Hot Water bath separation | Rich Oil Sand RF stimulated well |
| Produced Oil Base | Asphalt | Paraffin |
| API Gravity (hydrocarbon relative density) | ~8 | ~14 |

TABLE 2-continued

| Comparison Of RF Produced Oil With Clark Process Bitumen | | |
|---|---|---|
| Method | Mining Process, Typical | RF Process, Measured |
| Viscosity in Centipoids, 20° C. | 200,000 | 39,100 |
| Saturates | 17% | 20% |
| Aromatics | 39% | 42% |

After the 35 days of RF heating, and a cool down period that followed, a paddle was dipped into the RF produced oil, which had nearly filled the oversized hole containing the antenna assembly 24. As the oil test was conducted during cold surface conditions, the temperature of the produced oil had by the time of sampling cooled to −12 degrees Celsius. In spite of the low −12 Celsius oil measured temperature, the RF produced oil slowly ran off the paddle. As can be appreciated, the RF produced oil was thinned and may have been near pipeline grade viscosity. Several days had elapsed before the oil sample was analyzed. RF produced oil may thicken over time, so the RF produced oil may have had an even lower viscosity immediately upon completion of the RF heating. Electric and magnetic fields of RF heating cause temporary aggregation of asphaltene or paraffin particles into larger ones, which in turn temporarily modifies the rheological properties of the RF produced oil. The aggregation based thinning may last for a time of hours, and it is repeatable. Realized thinning times were sufficient for extraction during the RF heating. After the test, oil sand surrounding the antenna was lighter in color than unheated oil sand nearby.

In oil sand, RF heating with the apparatus 10 produces oil with 3 to 5 times more C12 to C28 range molecules than bitumen produced by the Clark Hot Water Process. The lower molecular mass hydrocarbons produced by the apparatus 10 are produced at bulk temperatures of less than about 130° C.: RF electric fields can cause hydrocarbon cracking, and RF electromagnetic fields (electric and magnetic) are known to cause selective heating of one molecule type over another. Advantageously, the C12 to C28 molecules may be in the valuable diesel and lubricating oil range.

Figure 8:
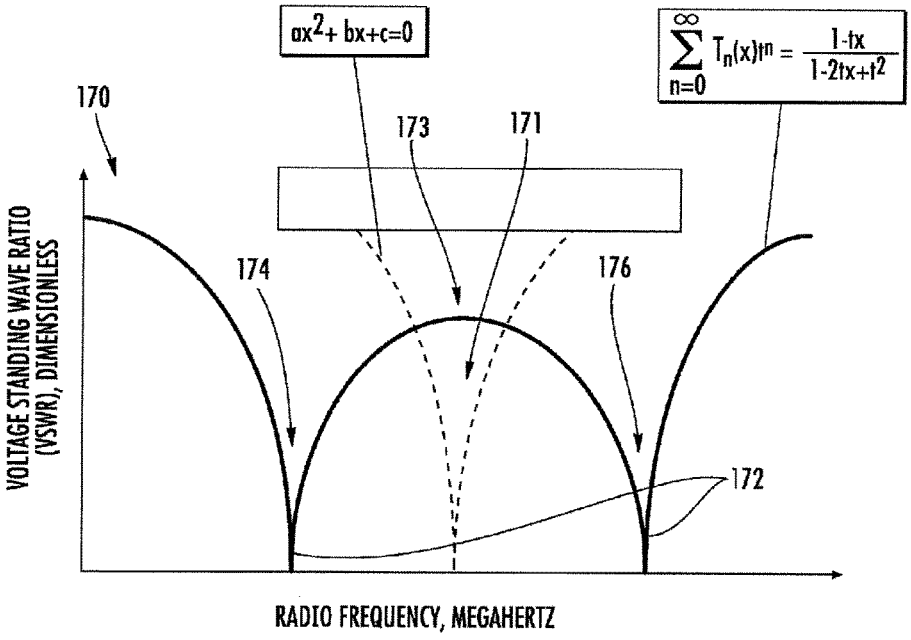
FIG. 8 is a diagram showing a double tuning method for the apparatus of FIG. 1.

Referring to FIG. 8, graph 170, an additional method of tuning the balun and dipole comprising the RF antenna assembly 24 will now be described, known here as a method of double tuning. The double tuning method may advantageously allow for holding the operating frequency of the RF source 13 constant throughout the RF heating, as the double tuning method provides for increased VSWR bandwidth from the RF antenna assembly 24. For explanation, trace 171 shows the VSWR response versus frequency of a half wave dipole comprised of the first and second tubular dipole elements 81a, 81b if no transmission line or common mode currents were present. This dipole response alone is quadratic or "single dip". In the double tuning method for the RF antenna assembly 24, the balun 15 is included and the spacing s (see FIG. 2) between the proximate ends of the first tubular dipole element 81a and the tubular balun 15 is varied to produce a double tuned VSWR response depicted as trace 172 in the FIG. 8. The double tuned trace 172 response may comprise a $4^{th}$ order Chebyschev polynomial response in some embodiments. A closer spacing s results in a spreading apart of the VSWR minima 174, 176 and an increase in the VSWR bandwidth of the RF antenna assembly 24. A wider spacing s results in a closer spacing of the VSWR minima 174, 176 and a smaller VSWR bandwidth. The double tuning may provide a RF antenna assembly 24 VSWR bandwidth that is about 2 to 4 times that of the half wave dipole by itself. VSWR ripple amplitude 173 will vary with spacing s and is traded for with the VSWR bandwidth required.

The double tuning in the RF antenna assembly 24 may result from the controlled coupling of two coaxial resonators that exist in situ: 1) the inside surfaces of the first tubular dipole element 81a, and 2) the inside surface of the tubular balun 15. These two structures have the aspects of resonant coaxial stubs that use the outer conductor 71 as their inner conductor. In other words, the first tubular dipole element 81a and tubular balun 15 are coaxial transmission lines over coaxial transmission lines. Heating a subterranean formation 17 may initially increase formation electrical conductivity due to increased salt concentration and later decrease conductivity as the liquid water content is further eliminated. Changing water content may change heating applicator/RF antenna assembly 24 electrical impedance and cause the need for tunings.

A method of the present embodiments to increase electrical load resistance is provided by adjusting the ratio of the lengths of the first and second tubular dipole elements 81a, 81b. The method may also include adjusting the first and second tubular dipole elements 81a, 81b in order to make the dipole antenna resistance equal to the transmission line 82 characteristic impedance. When the RF antenna assembly 24 is insulated from the subterranean formation 17, making the first and second tubular dipole elements 81a, 81b equal in length results in a lower or minimum value of electrical resistance. Making the first and second tubular dipole elements 81a, 81b unequal in length results in an increased or higher electrical resistance across the tubular isolator 31.

In general, the more conductive the subterranean formation 17 is, the lower the electrical resistance provided by the RF antenna assembly 24, so the more unequal in length the first and second tubular dipole elements 81a, 81b may be adjusted. Preferred load resistance values provided by the first and second tubular dipole elements 81a, 81b may be between about 30 and 70 ohms due to the characteristic impedances required for coaxial transmission lines of lowest loss, highest voltage withstanding, and or greatest current handling. The resistance versus length ratio of the first and second tubular dipole elements 81a, 81b may resemble a tangent function as sine shaped voltage and cosine shaped current relationships may exist. The method for controlling the load resistance may include using subterranean formation 17 electrical conductivity obtained a priori from well induction resistivity logs, prior to the apparatus 10 installation and completion.

Advantageously, the method allows the apparatus 10 and the RF antenna assembly 24 to heat subterranean formations having a wide range of electric conductivities, ranging from about 0.00001 mhos/meter conductivity to 10 mhos/meter and to do so without an underground transformer. As typical, the conductivity of subterranean water can be a function of dissolved carbon dioxide, which forms weak carbonic acid, $OH^-$ radical molecules, and especially any dissolved salts.

Other features relating to apparatuses for RF heating are disclosed in co-pending application "RF ANTENNA ASSEMBLY WITH FEED STRUCTURE HAVING DIELECTRIC TUBE AND RELATED METHODS," U.S. patent application Ser. No. 13/804,415 filed Mar. 14, 2013, which is incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus for heating a hydrocarbon resource in a subterranean formation having a wellbore extending therein, the apparatus comprising:

a radio frequency (RF) source; and an RF antenna assembly configured to be positioned within the wellbore and coupled to said RF source;

said RF antenna assembly comprising a first tubular dipole element having opposing proximal and distal ends, an RF transmission line extending through the proximal end of said first tubular dipole element and comprising an inner conductor, an outer conductor, and a dielectric therebetween, said inner conductor extending outwardly beyond the distal end of said first tubular dipole element, said outer conductor coupled to the distal end of said first tubular dipole element, a second tubular dipole element having opposing proximal and distal ends, with the proximal end of the second tubular dipole element being adjacent the distal end of said first tubular dipole element and being coupled to said inner conductor, and a tubular balun having said RF transmission line extending therethrough and opposing proximal and distal ends, with the distal end of the tubular balun being adjacent the proximal end of said first tubular dipole element and the proximal end of *the* tubular balun being coupled to said outer conductor.

2. The apparatus of claim 1 wherein said RF antenna assembly comprises a tubular isolator having said RF transmission line extending therethrough and configured to couple together said tubular balun and said first tubular dipole antenna element.

[3. The apparatus of claim 2 wherein said tubular isolator comprises a cyanate ester composite material.]

4. The apparatus of claim 1 wherein said RF antenna assembly further comprises a feed structure comprising:

a dielectric tube between said first and second tubular dipole antenna elements;

a first connector coupling said outer conductor to said first tubular dipole element; and a second connector coupling said inner conductor to said second tubular dipole element.

[5. The apparatus of claim 4 wherein said first and second tubular dipole elements each comprises a threaded end; and wherein said first and second connectors each comprises a threaded end engaging a respective threaded end of said first and second tubular dipole elements for defining overlapping mechanical threaded joints.]

[6. The apparatus of claim 4 wherein said first and second connectors each comprises a recess for receiving adjacent portions of said dielectric tube.]

[7. The apparatus of claim 4 wherein said dielectric tube comprises a cyanate ester composite material.]

[8. The apparatus of claim 1 wherein said inner conductor comprises a tube defining a first fluid passageway therein; and wherein said outer conductor is spaced from said inner conductor to define a second fluid passageway.]

9. The apparatus of claim 1 further comprising a tubular ferrite choke surrounding said RF transmission line and spaced apart from the proximal end of said tubular balun.

10. The apparatus according to claim 1 wherein said first and second tubular dipole elements have a desired operating frequency; and wherein each of said first tubular dipole element, said second tubular dipole element, and said tubular balun has a length corresponding to +/−10% of a quarter of a wavelength of the desired operating frequency.

11. An apparatus for heating a hydrocarbon resource in a subterranean formation having a wellbore extending therein, the apparatus comprising:

a radio frequency (RF) source;

an RF antenna assembly configured to be positioned within the wellbore and coupled to said RF source;

said RF antenna assembly comprising a first tubular dipole element having opposing proximal and distal ends, an RF transmission line extending through the proximal end of said first tubular dipole element and comprising an inner conductor, an outer conductor, and a dielectric therebetween, said inner conductor extending outwardly beyond the distal end of said first tubular dipole element, said outer conductor coupled to the distal end of said first tubular dipole element, a second tubular dipole element having opposing proximal and distal ends, with the proximal end of the second tubular dipole element being adjacent the distal end of said first tubular dipole element and being coupled to said inner conductor, a tubular balun having said RF transmission line extending therethrough and opposing proximal and distal ends, with the distal end of the tubular balun being adjacent the proximal end of said first tubular dipole element and the proximal end of the tubular balun being coupled to said outer conductor, a tubular isolator having said RF transmission line extending therethrough and configured to couple together said tubular balun and said first tubular dipole antenna element, and a feed structure comprising a dielectric tube between said first and second tubular dipole antenna elements, a first connector having a first circumferential slot for receiving said dielectric tube, and a second connector having a second circumferential slot for receiving said dielectric tube; and a tubular ferrite choke surrounding said RF transmission line and spaced apart from the proximal end of said tubular balun.

[12. The apparatus of claim 11 wherein said tubular isolator comprises a cyanate ester composite material.]

[13. The apparatus of claim 11 wherein said first and second tubular dipole elements each comprises a threaded end; and wherein said first and second connectors each comprises a threaded end engaging a respective threaded end of said first and second tubular dipole elements for defining overlapping mechanical threaded joints.]

[14. The apparatus of claim 11 wherein said dielectric tube comprises a cyanate ester composite material.]

[15. The apparatus of claim 11 wherein said inner conductor comprises a tube defining a first fluid passageway therein; and wherein said outer conductor is spaced from said inner conductor to define a second fluid passageway.]

16. A method for making a radio frequency (RF) antenna assembly for heating a hydrocarbon resource in a subterranean formation having a wellbore extending therein, the method comprising:

providing a first tubular dipole element having opposing proximal and distal ends;

positioning an RF transmission line to extend through the proximal end of the first tubular dipole element, the RF transmission line comprising an inner conductor, an outer conductor, and a dielectric therebetween, the inner conductor extending outwardly beyond the distal end of the first tubular dipole element, the outer conductor to be coupled to the distal end of the first tubular dipole element;

providing a second tubular dipole element having opposing proximal and distal ends, with the proximal end of the second tubular dipole element being adjacent the distal end of the first tubular dipole element and coupled to the inner conductor; and positioning a tubular balun to have the RF transmission line extending therethrough, the tubular balun having opposing proximal and distal ends, with the distal end of the tubular balun being adjacent the proximal end of the first tubular dipole element and the proximal end of the tubular balun to be coupled to the outer conductor.

17. The method of claim 16 further comprising coupling together the tubular balun and the first tubular dipole antenna element with a tubular isolator having the RF transmission line extending therethrough.

18. The method of claim 16 further comprising forming a feed structure by at least:

coupling a dielectric tube between the first and second tubular dipole antenna elements;

coupling the outer conductor to the first tubular dipole element using a first connector; and coupling the inner conductor to the second tubular dipole element using a second connector.

[19. The method of claim 16 further comprising:

forming the inner conductor to comprise a tube defining a first fluid passageway therein; and forming the outer conductor to be spaced from the inner conductor to define a second fluid passageway.]

20. The method of claim 16 further comprising positioning a tubular ferrite choke to surround the RF transmission line and to be spaced apart from the proximal end of the tubular balun.

* * * * *